United States Patent
Bailey

(10) Patent No.: US 7,298,526 B2
(45) Date of Patent: Nov. 20, 2007

(54) METHOD FOR CONFIRMING CORRECT SELECTION OF AN OUTPUT PROFILE OF A PRINTER

(75) Inventor: Martin Bailey, Comberton (GB)

(73) Assignee: Global Graphics Software Limited, Cambridge (GB)

( * ) Notice: Subject to any disclaimer, the term of this patent is extended or adjusted under 35 U.S.C. 154(b) by 1013 days.

(21) Appl. No.: 10/394,395

(22) Filed: Mar. 20, 2003

(65) Prior Publication Data

US 2004/0184051 A1 Sep. 23, 2004

(51) Int. Cl.
*H04N 1/56* (2006.01)

(52) U.S. Cl. .................... 358/1.9; 358/504

(58) Field of Classification Search ............ 358/1.9, 358/504
See application file for complete search history.

(56) References Cited

U.S. PATENT DOCUMENTS

| | | | |
|---|---|---|---|
| 2001/0028471 A1* | 10/2001 | Hirokazu | 358/1.13 |
| 2003/0034983 A1* | 2/2003 | Muramoto | 345/589 |
| 2004/0004731 A1* | 1/2004 | Itagaki | 358/1.9 |

* cited by examiner

*Primary Examiner*—Kimberly A. Williams
(74) *Attorney, Agent, or Firm*—Darby & Darby P.C.; Bruce E. Black

(57) ABSTRACT

A method for using a page description language to electronically express colored patches on the border of contract proofs, such that a user can quickly and easily evaluate whether the color of prints produced using a color printer are correct. The verification is performed by visually comparing the test patches added to a print with color patches in publicly available standard color sample swatches.

20 Claims, 4 Drawing Sheets

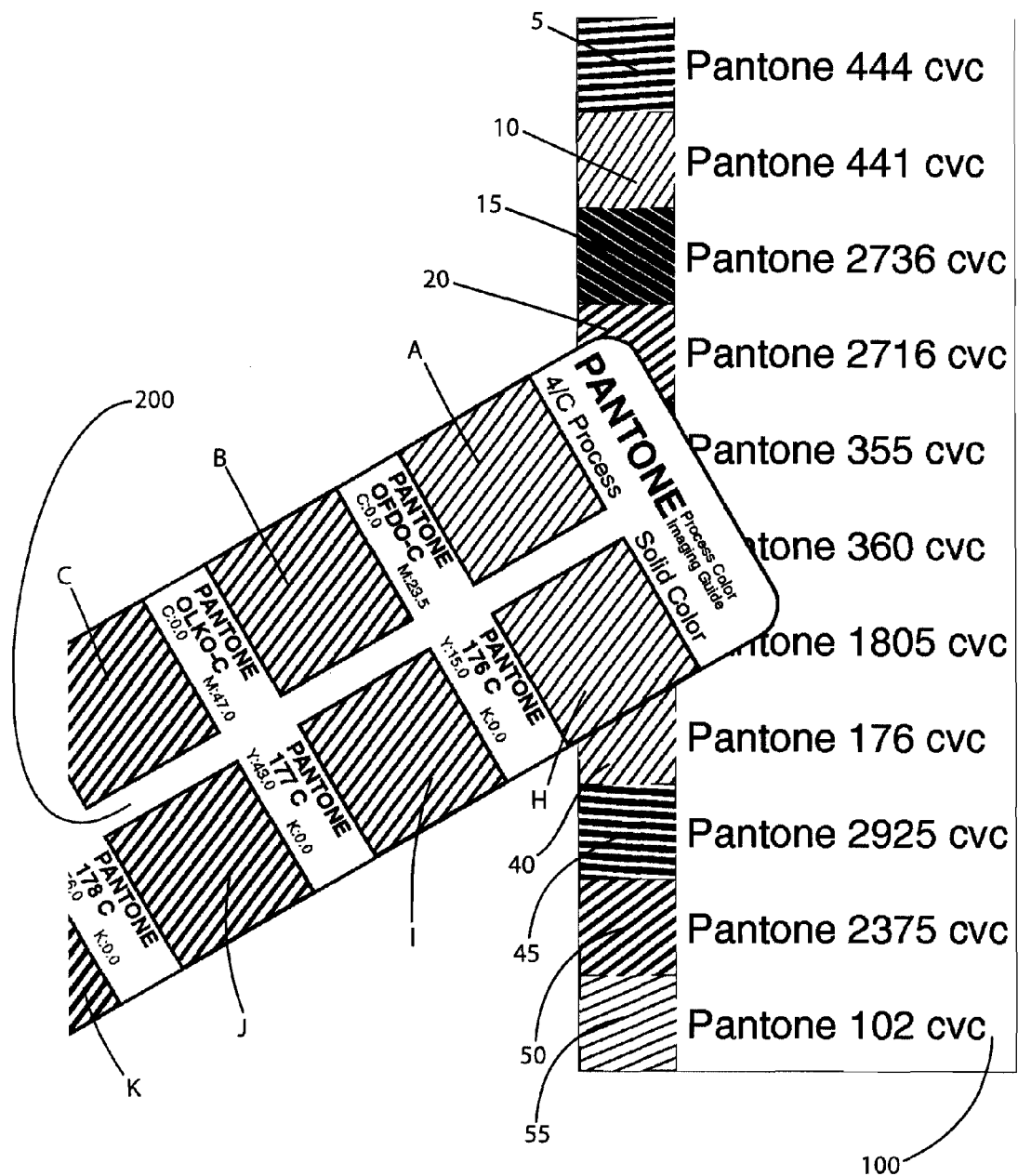

METHOD FOR CONFIRMING CORRECT SELECTION OF AN OUTPUT PROFILE OF A PRINTER

BACKGROUND OF THE INVENTION

1. Field of the Invention

The invention relates to the field of computer graphics and, more particularly, to a method for confirming a correct selection of an output profile for pre-press workflows.

2. Description of the Related Art

The use of color printers in the graphic arts industry for producing draft prints or "proofs" from digital files is increasing rapidly. The same digital files are later used to produce the necessary plates, screens, cylinders or other master copies of the pages for use in producing the final printed piece.

In some cases, the proof is intended to provide only a rough idea of the color of its final reproduction, but in others the proof is treated as an accurate prediction of the color of the final printed piece. Such accurate proofs are sometimes referred to as "contract proofs" because they form part of the contract between a printing company that will print a job on their presses and their clients, who have designed and created the job as digital files.

When configuring a color printer to produce accurate color output, it is almost always necessary to apply some form of color management technology. This is most often achieved using color profiles that conform to the specification published by the International Color Consortium (ICC). A color profile must be selected based on the printer model being used, the media (often paper) that will be printed on, and the ink or colorant donors that will be used to create an image on the media. Collectively, these criteria are referred to as an output profile.

The color of output from most types of printers varies over time, and in some cases can change quite rapidly. Thus, many printing workflows require calibration of the printer such that it matches the configuration for which the profile was created. This may require frequent recalibrations of the printer.

The printing press that will be used to make the final printed piece typically has very different color characteristics than the printer employed to produce proofs. If the proof is to provide an accurate prediction of the color of the final printed piece, then an additional profile must be selected in order to provide a description of the characteristics of the print press.

It will be apparent to one of ordinary skill in the art that there are many steps that a user of such a color printer must follow in order to produce a proof that provides an accurate prediction of the color of the final printed piece. It is therefore important that a mechanism be provided to validate that each one of the correct steps was taken; (a) that the correct color profiles (or other mechanisms for specifying color behavior) were selected, and (b) that the printer being used did not require recalibration.

These same requirements also apply in those cases where color management is applied during processing of digital files for final print reproduction. This is occasionally performed for work that is printed on conventional impact presses (whether using offset lithography, gravure, screen printing, etc), but is more common when printing on non-impact digital presses using technologies such as dry toner or ink-jet, to directly image onto paper or some other media.

It is a common practice to add a number of color patches to prints outside an area of a page that is produced on the final printed and trimmed piece. Such collections of patches are usually described as "color bars" or "control strips." Some visual assessment of the accuracy of a print may be made from a well constructed color bar. When producing a print, however, it is necessary to measure patches with an instrument, such as a calorimeter or spectrophotometer, or to compare the patches with known accurate sample patches to properly ascertain whether a printer was correctly configured.

Colorimeters and spectrophotometers are expensive, as well as slow to use. Often there is a clear correlation between the speed of checking color patches and the cost of the instrument. A device that is capable of operating quickly enough for use in a production environment will often cost more than is readily justifiable.

Sample test sheets of color patches known to be of the correct color that are provided for comparison with the color bar on the proof have a rather short life span. Many such patches will fade, or darken, or the color will change in some way as the patches age. This is particularly true when the color patches are left in daylight. Such changes render the patches unusable for evaluating the color of prints.

The provision of such patches also means that the tool set of which they form a part must be supplied in physical form to a new site to which the tool set is sold or otherwise provided, rather than using a faster and cheaper electronic delivery method.

SUMMARY OF THE INVENTION

The present invention is a method for using a page description language to electronically express a number of colored patches, such that a user can confirm whether a current selection of an output profile of a printer is correct.

In accordance with the method of the invention, the colors of the patches are selected from those that are included in widely available commercial swatch books that the users of a color printer might be reasonably expected already possess. The choice of which swatch book to base selections on is guided by the geographical area and sector of the print market that specific embodiments of the invention are produced for. In the preferred embodiments, the swatch book that is most widely used in a specific market is chosen. For example, North America and Europe the most commonly used such swatch book is sold by PANTONE®, Inc. Certain swatch books define characteristics of the printed piece other than color, such as swatches of metallic or textured inks. In accordance with the contemplated embodiments of the invention, such swatches are not selected.

The method of the present invention requires the establishment of certain criteria for determining a number of patches and their associated colors. In first criteria, all colors that are selected must be within the color range of the printer for which the patches are being prepared. That is, the printer must be capable of reproducing the selected colors. Furthermore, when the printer is configured to emulate the colors that are produced from the file that defines the patches by a different printing device, such as a printing press, then the colors selected must also be within the color range of the different printing device.

In other criteria, a range of colors that provides a reasonable coverage of the color range of the printer must be selected. That is, all colorants that are used by the printer to produce an image must be included in the criteria, such that errors in a color profile, or in the calibration of the printer that affect only one colorant are identified.

In further criteria, colors that are especially critical for assessing the accuracy of the color of a print must be included in the selection. The present criteria typically ensure that colors that are similar to natural skin tones are also included in the color patches. Where specific colors are commonly used, and it is important that they are reproduced accurately, such as the colors in a corporate logo, these colors must also be included in the patches that are selected.

In accordance with the method of the invention, the color of each patch is expressed using a device independent color space, as specified by the international body that defines basic specifications related to the perception of light and color, i.e., Commission International de l'Eclerage (CIE). Here, the color in each patch is expressed using color spaces such as "CIE XYZ" or "CIE L*a*b*." By definition, the rendering of a patch is only affected by the output profile that is selected and the calibration that is applied to each colorant used to image the patch onto the medium.

The description of the color patches does not exploit any programmable features of the page description language. Moreover, in accordance with the contemplated embodiments of the invention, no attempt is made to examine the result of the test and render a decision of what to draw next, based on the result of the examination. Instead, the color patches are structured such that when the colors are rendered on a printer that is incorrectly configured for the media and ink or colorant donors in use, the printer automatically produces a color that is different from that against which it is being visually compared.

In addition, the contemplated embodiments of the invention do not require any instrumentation. Color patches are added to the margins of an electronic representation of a page, part of a page, or collection of pages that are also expressed using a page description language, printer command language or other suitable file format. The patches are thus included on that page, part of a page, or collection of pages.

When the page, partial page or collection of pages is printed, each color patch is then visually compared with a corresponding patch in a swatch book that matches the color patch from which the initial color selections were made. In preferred embodiments, the comparison is performed in an appropriately lit environment, using a swatch book in which the patches have not faded, darkened, or otherwise changed color. In addition, the visual comparison is performed when the print has dried for a long time such that color changes due to drying have stabilized.

A significant difference in color between the color patch on the print and the color patch in the swatch book provides an indication that the printer configuration is incorrect. As a result, the user is provided with a way to detect whether or not the print provides an accurate representation of the colors selected in the electronic representation of the page, part of a page, or collection of pages.

BRIEF DESCRIPTION OF THE DRAWINGS

The foregoing and other advantages and features of the invention will become more apparent from the detailed description of the exemplary embodiments of the invention given below with reference to the accompanying drawings in which:

FIG. 3 is an illustration of a comparison of a patch on a printed sheet with a patch in a PANTONE® swatch book for the color labeled PANTONE 176 C.

DETAILED DESCRIPTION OF THE EXEMPLARY EMBODIMENT

Figure 1:
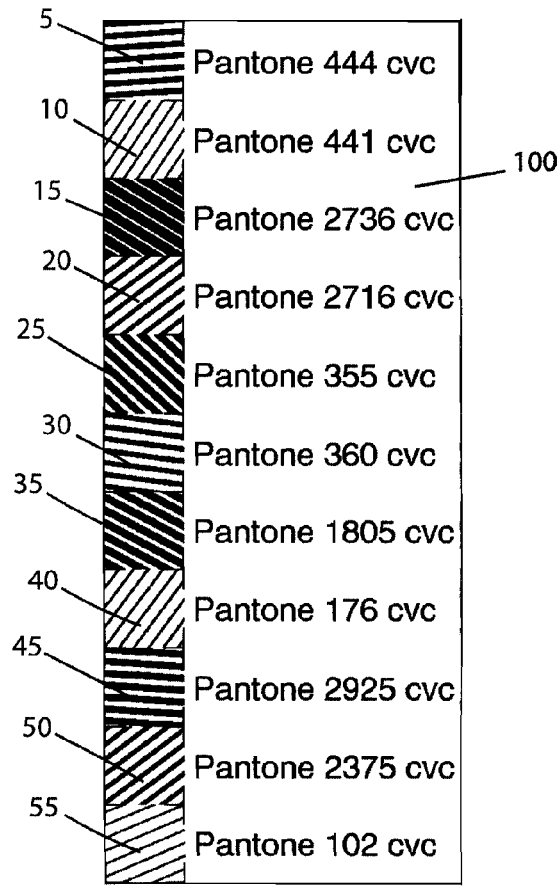
FIG. 1. is a monochromatic representation of a printout in the margins of a page, partial page or collection of pages in accordance with the invention.

FIG. 1 is a monochromatic representation of a printout in the margins of a page, partial page or collection of pages in accordance with the invention. Referring to FIG. 1, there can be seen a printout 100 comprising a set of patches 5 thru 55 and corresponding labels for permitting the easy location of a corresponding patch in a swatch book. Here, colors are represented figuratively by different hatching.

In accordance with the method of the invention, a fragment of page description is provided to draw multiple colors selected from the Patone® coated swatch book developed by Patone®, Inc. In alternative embodiments, the patches are selected from a DIC™ or a TOYO™ swatch book. In preferred embodiments, eleven colors are drawn on a page.

Preferably, the page description language is the PostScript® language developed by Adobe® Systems, Inc. In another embodiment, the page description language is the Portable Document Format (PDF).

An exemplary software code expressed as an encapsulated PostScript file to draw the preferred fragment of page description is as follows:

```
%!PS
%%Title: Visual test chart
%%BoundingBox: 0 0 110 264
% Copyright Global Graphics Software Ltd, 2000. All Rights Reserved
%%EndComments
0 0 moveto
0.25 setlinewidth
/Helvetica 10 selectfont
    [
    /CIEBasedABC <<
        /XUID [124 0 0 19950322 15050]
        /RangeABC [0 0.9642 0 1 0 0.8249]
        /RangeLMN [0 0.9642 0 1 0 0.8249]
        /WhitePoint [0.9642 1 0.8249]
    >>
] setcolorspace
    [
    [ (Pantone 102 cvc)    .7149  .7779  .0611 ]
    [ (Pantone 2375 cvc)   .4805  .3220  .4604 ]
    [ (Pantone 2925 cvc)   .2013  .2452  .5464 ]
    [ (Pantone 176 cvc)    .6728  .5551  .4002 ]
    [ (Pantone 1805 cvc)   .2005  .1111  .0247 ]
    [ (Pantone 360 cvc)    .2474  .3950  .0976 ]
    [ (Pantone 355 cvc)    .0800  .1950  .0485 ]
    [ (Pantone 2716 cvc)   .3742  .3657  .5826 ]
    [ (Pantone 2736 cvc)   .0717  .0394  .3013 ]
    [ (Pantone 441 cvc)    .5974  .6292  .5346 ]
    [ (Pantone 444 cvc)    .2132  .2286  .2055 ]
] {
    aload pop setcolor
    0 0 24 24 rectfill
    gsave
    0 setgray
    [ 12 12 ] 6 setdash
    0 0 24 24 rectstroke
    27 8 moveto
    show
    grestore
    0 24 translate
```

-continued

```
} bind forall
showpage
%%EOF
```

In accordance with the method of the invention, a pre-press operator configures a Raster Image Processor (RIP) to add a fragment of page description to the margins of each page that is printed. In alternative embodiments, the operator adds the fragment when preparing the imposition layout for each job, or includes the fragment as part of the job itself. As a result, each time that a page is subsequently printed, the marks expressed by the page description fragment are printed in the margins of the page. Here, a person skilled in the art would appreciate that an imposition layout is a portion of a pre-press work flow, i.e., a sequence of software applications that typically includes an imposition program for appropriately laying out the pages on each printing plate.

Figure 2:
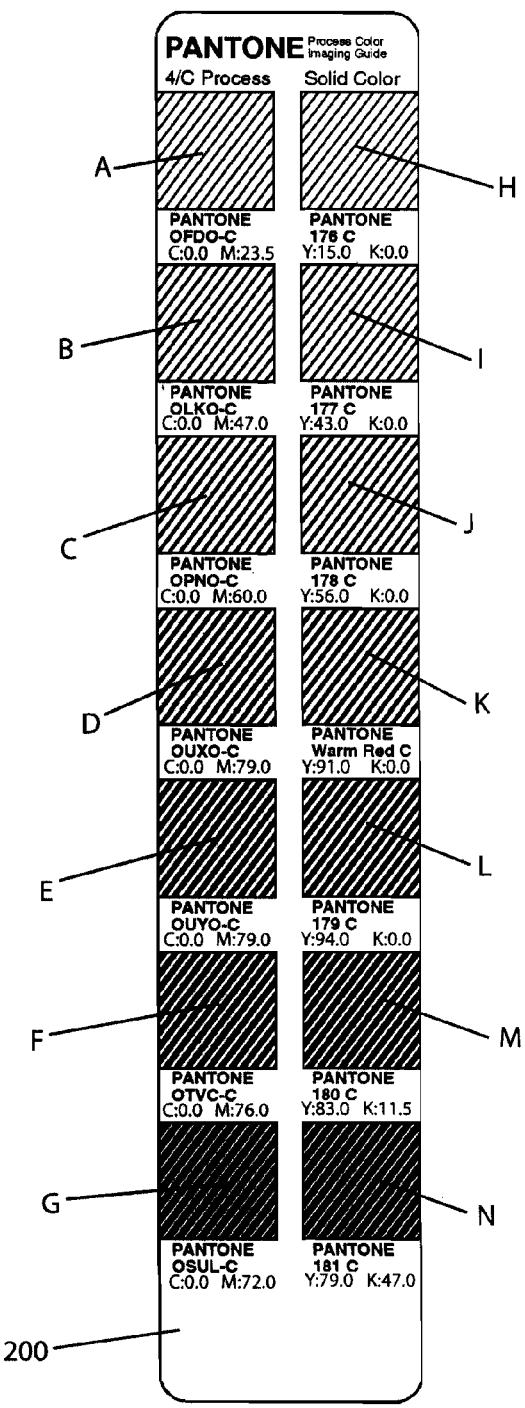
FIG. 2 is a monochromatic representation of a page from a PANTONE® swatch book.

On completion of printing, the operator physically obtains a current swatch book 200 that corresponds to the printed patches, e.g., a Pantone swatch book containing swatches of Pantone process colors. An exemplary page from an appropriate swatch book 200 is shown in FIG. 2. Here, colors are represented figuratively by different hatching patterns A thru H.

Turning now to FIG. 3, the operator then locates the patch in the swatch book 200 labeled according to the first printed patch on the printed piece 300, and compares the two patches. If the marks are printed in the exemplary manner illustrated in FIG. 3, where the color of the patch 40 (e.g., Pantone 176C) on the printed piece matches the color of the corresponding patch H in the swatch book 200, then the operator repeats the process for all the patches. If all the printed patches 5 thru 50 match the respective patches A thru H in the swatch book 200, the operator can then conclude that the output configuration of the printer is correct, and no further action needs to be taken.

However, if one or more of the patches do not match their counterpart patches in the swatch book, then the operator must conclude that the output configuration of the printer is incorrect and he should take steps to correct the output configuration and reprint the page. The printer configuration may be corrected by either "direct copying," by using PostScript rules, or by using an output profile to reconfigure the printer.

In an embodiment of the invention, where numerous prints are to be examined, the operator assembles a reference chart by removing the appropriate patches from the swatch book and joining them together in the correct order and spacing for placement alongside the prints so that each of the patches overlaps its corresponding reference patch at the same time. By arranging the patches in this manner, the ease with which multiple patches are compared is increased.

Figure 4A:
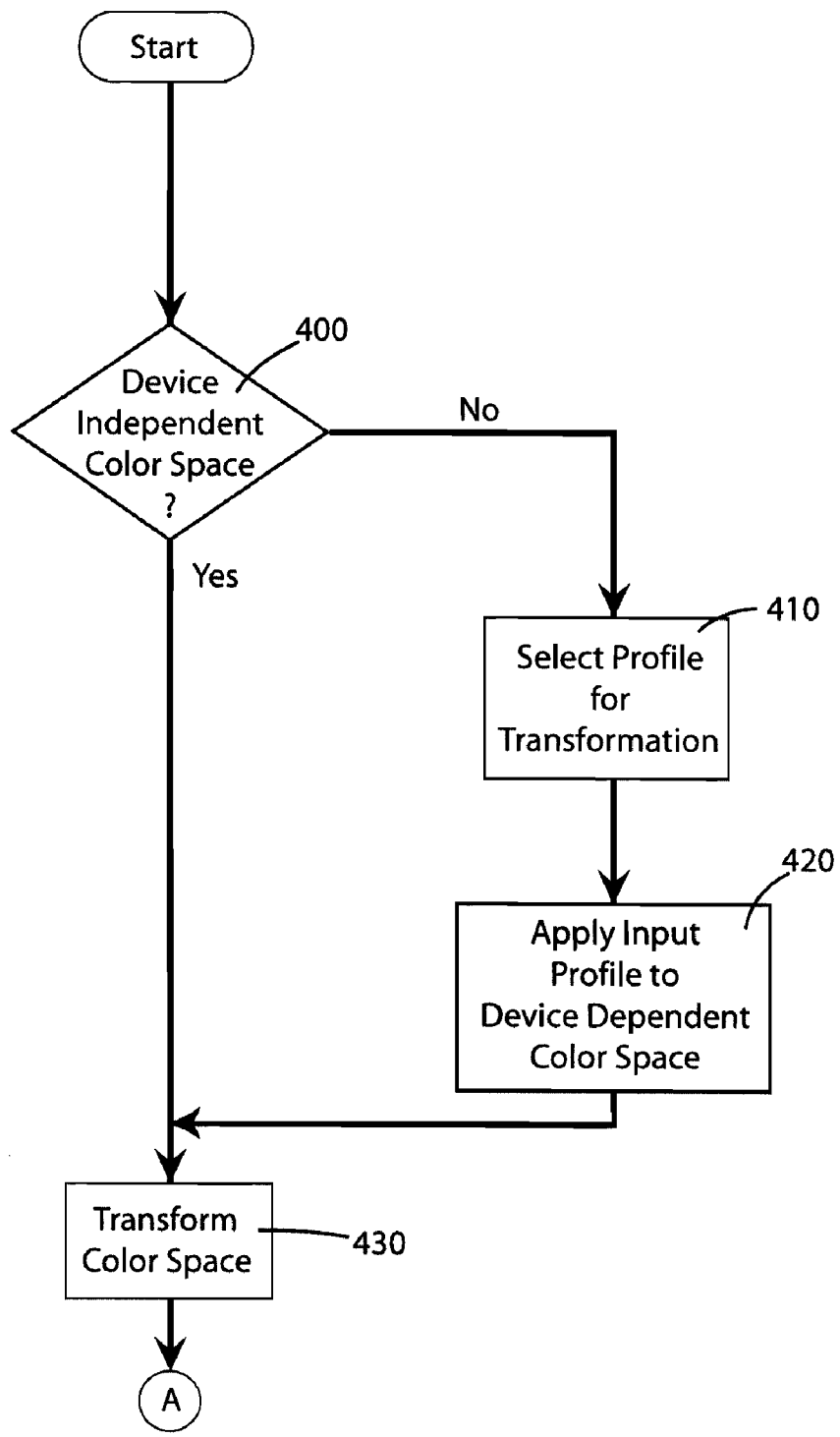
FIGS. 4(a) and 4(b) form a flow chart of the steps of the method of the invention.
Figure 4B:
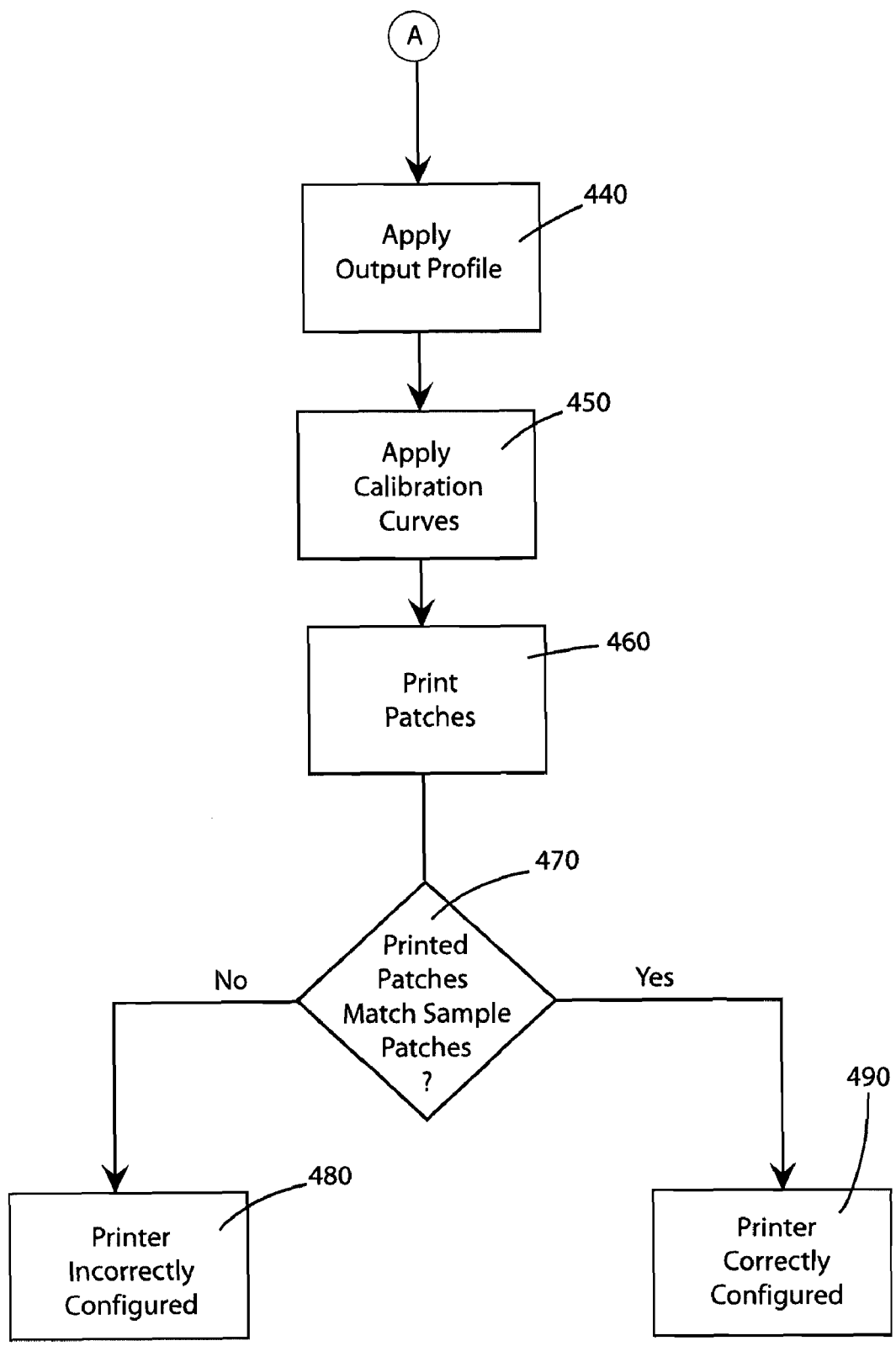

FIGS. 4(a) and 4(b) form an illustration of the steps of the method of the invention. In accordance with the invention, the method is implemented by performing a check to determine whether objects that generate marks on a page are encoded as device independent or device dependent spaces, as set forth in step 400.

If the objects are encoded as device independent spaces, such as defined in the CIE-based color spaces as defined in the PDF or PostScript specifications (e.g., CIEBasedA, CIEBasedABC, CIEBasedDEF, CIEBasedDEFG, Lab, ICC-Based, or CalRPGB), then the objects are converted into a Profile Connection Space (PCS) based on known algorithms. Generally, these algorithms are not configurable by a user. As a result, these transformations will always be correct due to the absence of any user input. It should be noted that a person skilled in the art would appreciate that a PCS is a standardized device independent color space.

On the other hand, if the objects are encoded as device dependent color spaces, such as DeviceGray, DeviceN, Separation, DeviceCMYK, or the like, then an operator selects the output profiles that are used to transform the objects into the PCS, as indicated in step 410. Here, a person skilled in the art would appreciate that definitions for DeviceGray, DeviceN, Separation, and DeviceCMYK can be readily located in the PDF or Postscript specification. Since the profiles are selected by the operator, each selection is therefore subject to the introduction of user error. An output profile is then applied to the objects encoded as device dependent color spaces, as indicated in step 420.

Next, the objects are transformed into PCS using an ICC color profile, as indicated in step 430. In accordance with the invention, the transformation is performed based on the International Color Consortium (ICC) color management specification, and an ICC based management workflow is assumed. However, there are other processing models in use, and it is not the intention of the inventor to limit the scope of the invention to the above described models.

Upon transformation of the color of objects into the PCS, the objects are then further transformed through an output profile as defined in the ICC color management specification, as indicated in step 440.

Next, the objects are calibrated using correction values that are applied to individual output colorants, such as Cyan, Magenta, Yellow and Black, as indicated in step 450. In preferred embodiments of the invention, the correction values are obtained from a look-up table that is located in memory of the printer. The calibrated objects are then printed, as indicated in step 460.

In accordance with the method of the invention, the user then performs a visual comparison between the printed color patch and a corresponding color patch in a swatch book, as indicated in step 470. The visual comparison is repeated for each printed color patch.

If upon performing the visual comparison, the operator determines that each printed color patch matches its corresponding color patch in the swatch book, then the operator can conclude that the output side processing of the printer has been correctly configured, and the process is terminated. If, however, they do not match, then the printer has not been configured correctly.

When the comparison of the printed patches with an appropriate, patch book shows a discrepancy, there are only two possible causes. First, the patch book against which the printed color patch is being compared has faded, darkened, or otherwise changed color. The method of the invention avoids this problem by requiring the use of a patch book that is current and up-to-date, and that has been appropriately stored. Second, the selected output profile or calibration curves are incorrect for the combination of output device, colorant donor, media, resolution, etc.

In accordance with the method of the invention, both the selection of the output profile and the calibration values are usually under the control of a user. However, such user controlled selections are sometimes indirect. That is, the appropriate calibration values and profiles are selected automatically based on the user choosing a paper type, such as glossy paper or matte paper.

The steps of the method as set forth in FIGS. 4(a) and 4(b) ensures that the color patches used in the method of the present invention are all encoded within device independent color spaces. As a result, the introduction of any user error that can affect the color definitions at any stage before or during conversion to PCS is avoided since any negative effects associated with the user error are not applied to device independent color spaces.

While the invention has been particularly shown and described with reference to exemplary embodiments thereof, it will be understood by those skilled in the art that various changes in form and details may be made therein without departing from the spirit and scope of the invention.

What is claimed is:

1. A method for confirming a correct selection of an output profile for a printer, comprising:
    encoding objects within a fragment of a page description in device independent color spaces;
    transforming the device independent objects through an output profile;
    calibrating the transformed objects based on calibration values that are applied to individual output colorants;
    configuring the printer to print the fragment of the page description in a margin of a printed page;
    comparing the printed fragment of the page description to a patch in a swatch book that corresponds to the printed fragment of page description to determine whether the printed fragment matches the patch in the swatch book; and
    correcting the printer configuration if the printed fragment of page description does not match the patch in the swatch book.

2. The method of claim 1, wherein said configuring step comprising the steps of:
    adding patches to one of a raster image processor associated with the printer, an imposition program and a print job.

3. The method of claim 1, wherein the swatch book is a DIC.TM. or TOYO.TM. swatch book.

4. The method of claim 1, wherein the objects are converted to a profile connection space based on known algorithms.

5. The method of claim 1, wherein the fragment of the page description comprises a plurality of patches.

6. The method of claim 5, wherein the fragment of the page description further comprises a reference name for each of the plurality of patches.

7. The method of claim 6, wherein each reference name is listed in the swatch book.

8. The method of claim 1, wherein the device independent color spaces are one of CIEBasedA, CIEBasedABC, CIEBasedDEF, CIEBasedDEFG, Lab, ICCBased, and CalRGB.

9. The method of claim 1, wherein the individual colorants are at least one of cyan, magenta, yellow and black.

10. The method of claim 1, wherein said comparison step comprising the step of: performing a visual comparison of the printed fragment of the page description to a patch in the swatch book.

11. The method of claim 10, wherein the visual comparison is performed for all printed fragments of the page description.

12. The method of claim 1, wherein the swatch book is a PANTONE.RTM. coated swatch book.

13. A computer readable medium having computer readable instructions stored thereon to:
    encode objects within a fragment of a page description in device independent color spaces;
    transform the device independent objects through an output profile;
    calibrate the transformed objects based on calibration values that are applied to individual output colorants;
    configure a printer to print the fragment of the page description in a margin of a printed page; and
    allow a user to correct the printer configuration if the printed fragment of page description does not match a patch in a swatch book.

14. The computer readable medium of claim 13, wherein the fragment of the page description comprises a plurality of patches.

15. The computer readable medium of claim 14, wherein the fragment of the page description further comprises a reference name for each of the plurality of patches.

16. The computer readable medium of claim 15, wherein each reference name is listed in the swatch book.

17. A system configured to confirm a correct selection of an output profile for a printer, comprising:
    means for encoding objects within a fragment of a page description in device independent color spaces;
    means for transforming the device independent objects through an output profile;
    means for calibrating the transformed objects based on calibration values that are applied to individual output colorants;
    means for configuring the printer to print the fragment of the page description in a margin of a printed page; and
    means for correcting the printer configuration if the printed fragment of page description does not match a patch in a swatch book.

18. The system of claim 17, wherein the fragment of the page description comprises a plurality of patches.

19. The system of claim 18, wherein the fragment of the page description further comprises a reference name for each of the plurality of patches.

20. The system of claim 19, wherein each reference name is listed in the swatch book.

* * * * *